United States Patent [19]

Spector

[11] Patent Number: 5,870,718
[45] Date of Patent: Feb. 9, 1999

[54] COMPUTER-PRINTER TERMINAL FOR PRODUCING COMPOSITE GREETING AND GIFT CERTIFICATE CARD

[76] Inventor: Donald Spector, 380 Mountain Rd., Union City, N.J. 07087

[21] Appl. No.: 607,345

[22] Filed: Feb. 26, 1996

[51] Int. Cl.[6] .................................................. G06F 17/00
[52] U.S. Cl. ............................ 705/26; 705/15; 705/26; 705/27; 364/468.01; 364/479.03; 364/514; 364/468.24; 235/381
[58] Field of Search ................................. 705/15, 26, 27; 364/514, 479.03, 468.01, 468.24; 235/381

[56] References Cited

U.S. PATENT DOCUMENTS

| | | | |
|---|---|---|---|
| 5,426,594 | 6/1995 | Wright et al. | 364/514 |
| 5,442,567 | 8/1995 | Small | 364/479.07 |
| 5,500,514 | 3/1996 | Veeneman et al. | 235/381 |
| 5,513,117 | 4/1996 | Small | 364/479.03 |
| 5,552,994 | 9/1996 | Cannon et al. | 364/468.01 |
| 5,590,038 | 12/1996 | Pitroda | 705/41 |
| 5,600,563 | 2/1997 | Cannon et al. | 364/468.24 |
| 5,615,123 | 3/1997 | Davidson et al. | 364/479.03 |
| 5,692,132 | 11/1997 | Hogan | 705/27 |
| 5,710,886 | 1/1998 | Christensen et al. | 705/14 |

*Primary Examiner*—Allen R. MacDonald
*Assistant Examiner*—Jagdish Patel
*Attorney, Agent, or Firm*—Michael Ebert

[57] ABSTRACT

A computer-printer Internet terminal adapted to produce under the control of its user a composite greeting and gift certificate card redeemable by the named recipient at a retail establishment linked to Internet which authorizes the issuance of the certificate. The terminal is provided with greeting card and gift certificate software which is selectively downloaded by the user of the terminal into the computer, making it possible for the user to compose and print out the composite card which carries a message of greeting addressed to the recipient and a gift certificate entitling the recipient to receive a gift from the retail establishment.

2 Claims, 1 Drawing Sheet

COMPUTER-PRINTER TERMINAL FOR PRODUCING COMPOSITE GREETING AND GIFT CERTIFICATE CARD

BACKGROUND OF INVENTION

1. Field of Invention

This invention relates generally to greeting cards and gift certificates, and more particularly to a computer-printer Internet terminal adapted to produce under the control of the user of the terminal a composite greeting and gift certificate card redeemable by the named recipient at a retail establishment linked to Internet.

2. Status of Prior Art

Internet is a world-wide information highway interlinking millions of computer terminals, each having many users. Associated with Internet are various commercially-operated on-line services, such as Prodigy, CompuServe and Online. One important use to which Internet is put is the retrieval of information from electronic libraries and other data bases, thereby giving each terminal access to a vast treasury of information. Another popular use for Internet is electronic or E-mail making it possible for terminals linked to Internet to communicate with each other.

E-mail communication may take the form of a greeting card composed at one terminal and transmitted to another terminal linked to Internet. Thus the 1995 U.S. Pat. No. 5,426,594 to Wright entitled "Electronic Greeting Card Store and Communication System" discloses a method by which a user of a personal communicator can select and pay for an electronic greeting card and to send it to another personal communicator for presentation to its user.

As noted in the Wright patent, the usual practice in sending a greeting card appropriate to a given occasion, such as a birthday or wedding anniversary, is for the individual to go to a retail store carrying greeting cards for various occasions and to select from what is available a card having an image and message printed thereon suitable for the occasion. The individual would pay for and take possession of the card and then write a personal message on the card before sending it to the party for which the card is intended.

This procedure may be inconvenient to the purchaser of the card, for it requires this individual to go to a greeting card store, search through the many cards there available to find an appropriate card, pay for the card, write a personal message thereon and then mail the card.

In the Wright system a first personal communicator accepts off-line selection of an electronic greeting card from a user, and then transmits a request message corresponding to the off-line selection of the electronic greeting card, the request message including at least an electronic greeting card identifier and a destination identifier. The electronic mail server receives the request message, and processes the request message by wireless transmission of an electronic greeting card message to the second personal communicator. The electronic greeting card includes a representation of an electronic greeting card image being identified by the electronic greeting card identifier. The second personal communicator is also identified by the destination identifier included with the request message. The electronic mail server updates billing information associated with an account of the first personal communicator in response to the electronic greeting card message being transmitted for billing the user of the first personal communicator therefor.

When a person is celebrating a birthday or other special occasion, it is common practice not only to send that person a greeting card appropriate to the occasion, but also a gift. In recent years a gift certificate has emerged as a viable alternative to the purchase of the gift itself.

Gift certificates offer many advantages over the purchase of a gift. If the gift giver is unsure of the needs of the recipient, a gift certificate offers a wide range of goods or services from which the recipient can choose. Currently, gift certificates can be purchased only at retail locations or through catalog houses. This is a drawback, for it is often inconvenient for one to have to travel to a store in order to purchase a gift certificate. To overcome this drawback, the 1993 U.S. Pat. No. 5,243,174 to Veeneman et al. "Method and Apparatus for Generating Gift Certificates" discloses an electronic gift certificate dispenser for printing and dispensing a gift certificate purchased by a credit card. A consumer approaches the dispenser and inserts a credit card into a magnetic card reader. The consumer then chooses a retailer from a menu of participating retailers and enters the gift certificate value.

The machine automatically verifies the credit card, causes the account to be debited and prints the gift certificate. A plurality of gift certificate dispensers devices can be connected in a network under the control of a central processing unit. Information regarding gift certificate purchases is transferred from the dispensers to the central processing unit to be collated and billed to credit card accounts. The central processing unit also informs merchants of the purchase of gift certificates that will be redeemed at their stores.

With the Veeneman et al. electronic gift certificate dispenser, it is no longer necessary to go to the selected retail establishment issuing the certificate to obtain it. But one must travel to the mall or center at which the dispenser is installed; hence the certificate certificate cannot be produced at home.

SUMMARY OF INVENTION

In view of the foregoing, the main object of this invention is to provide a computer-printer terminal adapted to produce under the control of its user a composite greeting and gift certificate card redeemable at a retail establishment which authorizes and is paid for the issuance of the certificate.

More particularly, an object of this invention is to provide a terminal of the above type which is linked by a modem to the Internet whereby the user of the terminal can surf Internet to find a retail store linked thereto that has available goods or services which the user wishes to give as a gift to the recipient of the card and that authorizes the user to issue the gift certificate.

Among the significant advantages of a computer-printer Internet terminal in accordance with the invention are the following:

A. The user of the terminal may compose a greeting message addressed to the named recipient which is personalized and reflects the user's feelings.

B. The user, in producing the gift certificate, has no need to go to a gift certificate dispenser installation or to a particular retail establishment issuing gift certificates, for the certificate is composed and printed at the user's terminal.

C. Payment for the gift certificate may be made via Internet.

Briefly stated, these objects are attained by a computer-printer Internet terminal adapted to produce under the content of lists user a composite greeting and gift certificate card redeemable by the named recipient at a retail establishment linked to Internet which authorizes the issuance of the certificate.

The terminal is provided with greeting card and gift certificate software which is selectively downloaded by the user of the terminal into the computer, making it possible for the user to compose and print out the composite card which carries a message of greeting addressed to the recipient and a gift certificate entitling the recipient to receive a gift from the retail establishment.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
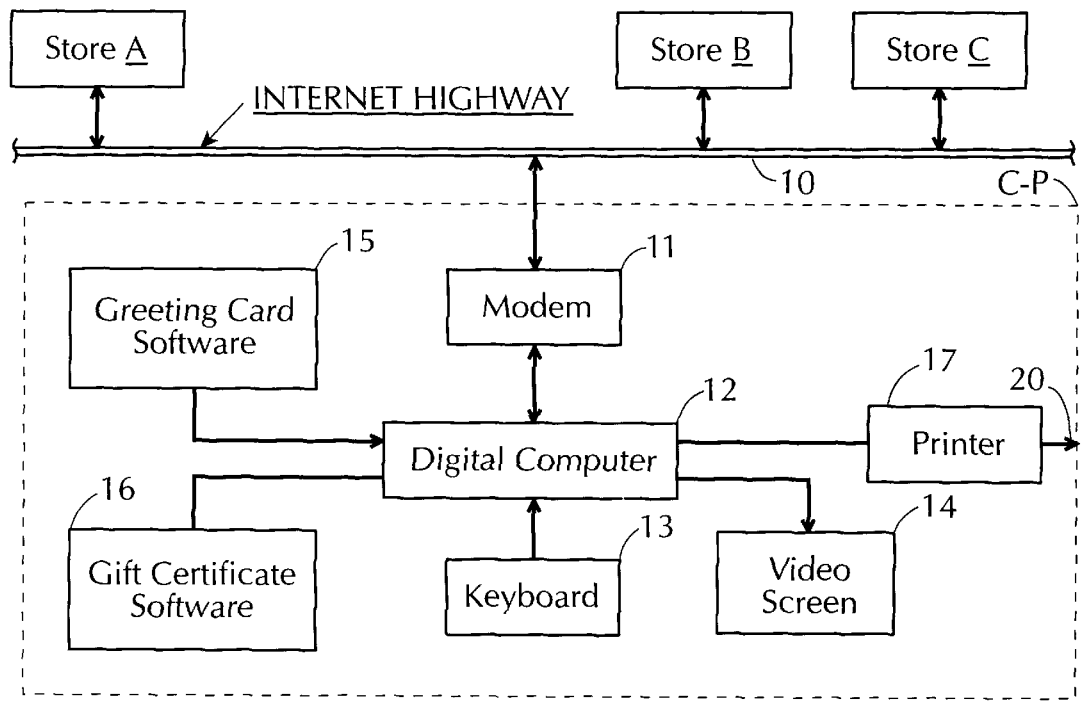
FIG. 1 is a block diagram of a computer-printer terminal in accordance with the invention linked with Internet.

FIG. 1 illustrates in block form a computer-printer terminal in C-P accordance with the invention adapted to produce under the control of its user a composite greeting and gift certificate card. Terminal C-P is linked to the Internet highway 10 by a modem 11. Also linked to Internet highway 10 are retail establishments which provide goods and/or services to customers and issue gift certificates therefor. FIG. 1 shows by way of example retail stores A, B and C linked to the highway so that the terminal C-P and the stores can communicate with each other.

The terminal includes a digital computer 12 provided with a manually-operated key board 13. Associated with computer 12 is a video screen 14 which visually presents the composite card composed by the user who operates the terminal.

The composite card consists of a personalized message of greeting directed to the named recipient of the card and a gift certificate redeemable by the recipient. The graphic design and terms of the greeting message and those of the gift certificate are selectively downloaded into the computer by its user who operates keyboard 13, this data being derived from greeting card software 15 and gift certificate software 16.

When the format of the computer card exhibited on video screen 14 is acceptable to the user, a printer 17 associated with computer 12 is then activated to print out the composite card which can then be mailed out to the recipient named on the card, or it can be transmitted to the recipient by E-mail.

In a typical digital computer, the hardware includes a central processing unit (CPU) and a main storage unit serving to store both the program and the data on which it operates. A storage address register holds the address of the storage location to be activated, either in order to read the contents of the location or for storing into the location. A storage data register temporarily holds data being read into and out of storage, while an arithmetic and logic unit (ALU) performs the specified operation on the data presented at its inputs. The ALU is routed to either a register stack and I/O control unit or to main storage by means of signals from the central processing unit (CPU). The computer hardware is controlled by a series of instructions stored in the main storage, the sequence of instructions constituting the computer program.

Figure 2:
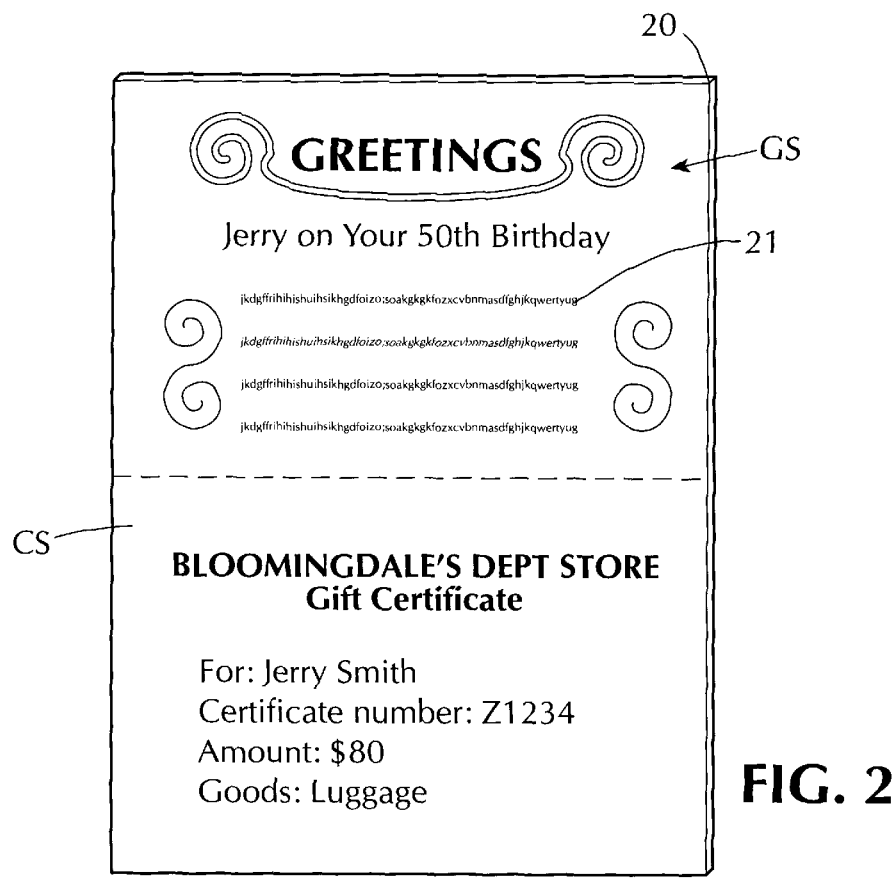
FIG. 2 illustrates the composite greeting and gift certificate card produced by the terminal.

In operation, a user operating key board 13 selects from the software 15 downloaded into the computer whatever text and graphics he wishes to appear on the greeting card section GS of the composite card 20, as shown separately in FIG. 2.

Thus the greeting section GS reads "Greetings Jerry on Your 50th Birthday"—below which is a personalized message 21. A greeting card computer program for this purpose may be similar to that disclosed in the electronic greeting card system disclosed in the above-identified Wright patent.

And the gift certificate card section CS of the card 20 shows a Bloomingdale's Department store gift certificate for Jerry Smith whose birthday is being celebrated. Section CS includes the registration number of the certificate, the product or products to which it is applicable, and the money amount of the gift. The computer program for producing the gift certificate section CS may be similar to that disclosed in the Veeneman et al. patent.

Before entering gift certificate date into the computer, the user of the terminal must surf the stores linked to Internet to find a store that carries the product or services he wishes to give as a gift. When the user makes his choice, he is advised via Internet by the selected store in regard to the Internet data to be printed in the gift certificate section of the card. The gift certificate can be paid for by the user of the terminal by credit card over the Internet. The payment procedure may be such as to involve a security control center in which the user is given a special security number.

Thus the user does not leave his home or office to compose and print out the composite card. He can bill the gift certificate to his credit card or to his telephone charge account, or to his bank account. The user of the terminal is under no time constraints, and it may take him 30 minutes or more to compose the composite card so that it is customized to the recipient and reflects the feelings of the user.

While there has been shown a preferred embodiment of the computer-printer terminal on internet for producing composite greeting and gift certificate card, it will be appreciated that many changes and modifications may be made therein without, however, departing from the spirit of the invention.

I claim:

1. A computer-printer Internet terminal for producing under the control of its user a composite card having printed thereon a greeting card section and a gift certificate section which is redeemable by a recipient named on the composite card, said system comprising:

A. a digital computer provided with a keyboard operable by the user;

B. first software means under the control of the keyboard to download into the computer selected data derived from greeting card software associated with the computer to compose a greeting card section appropriate to said recipient;

C. second software means under the control of the keyboard to download into the computer selected data derived from gift certificate software associated with said computer to compose a gift certificate section redeemable by the recipient at a retail establishment that has authorized the issuance of the certificate;

D. a printer associated with the computer which when activated, then prints a composite card containing said greeting card section and said gift certificate section; and E. means including a modem linking the terminal to an Internet highway to which said establishment is also linked to obtain authorization from said establishment to issue the certificate to the user of the terminal, said Internet highway linking the terminal to several retail stores, each selling goods and issuing gift certificates which when redeemed, entitle its holder to a specified amount of goods, the user of the terminal surfing the stores over the Internet highway to find and select a store issuing a gift certificate acceptable to the user, the selected store providing the user with gift certificate data to appear on the card.

2. A terminal as set forth in claim 1, further including a video screen associated with the computer to exhibit said composite card before it is printed.

* * * * *